UNITED STATES PATENT OFFICE.

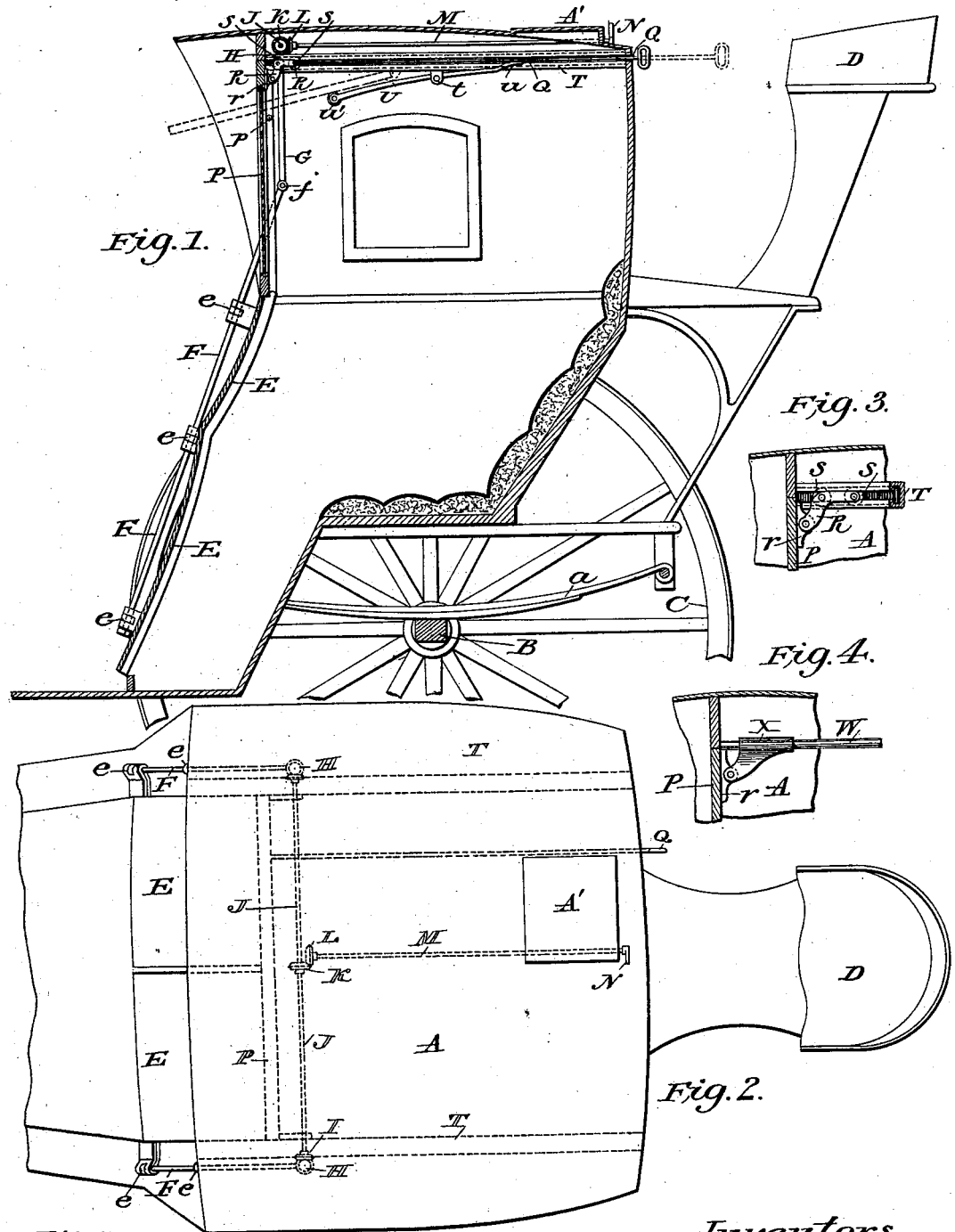

LUBIN PARADIS, OF CAMBRIDGE, AND NARCISSE DESROSIERS, OF BOSTON, MASSACHUSETTS.

HANSOM-CAB.

SPECIFICATION forming part of Letters Patent No. 601,202, dated March 22, 1898.

Application filed August 10, 1897. Serial No. 647,708. (No model.)

*To all whom it may concern:*

Be it known that we, LUBIN PARADIS, a citizen of the United States, and a resident of Cambridge, in the county of Middlesex, and NARCISSE DESROSIERS, a subject of the Queen of Great Britain, and a resident of Boston, in the county of Suffolk, State of Massachusetts, have invented certain new and useful Improvements in Hansom-Cabs, of which the following, taken in connection with the accompanying drawings, is a specification.

Our invention relates to that class of two-wheeled vehicles known as "hansom-cabs;" and it consists in the means of operating the folding doors and front window-sash from the driver's seat, as hereinafter described, and pointed out in the claims.

Referring to the accompanying drawings, Figure 1 represents a vertical longitudinal section of a hansom-cab embodying our invention. Fig. 2 is a plan or top view of same. Figs. 3 and 4 are detail views of the window-operating device.

A represents the body of the vehicle, mounted upon springs $a$, carried by the axle B, upon which are secured the wheels C C. D is the driver's seat at the rear, all of which may be of ordinary construction.

E E represent folding doors attached to the body A by bent or angular hinges $e$ $e$, one leaf of each of these hinges being secured to the body A and the other leaf to the doors E. A rod F on each side passes through these hinges and form the pintles. The leaves that are secured to the door are also rigidly secured to said rods F, and at their upper ends are by universal joints $f$ connected to vertical rods G, the upper ends of which are fitted with small bevel-wheels H, that are in gear with bevel-wheels I, mounted upon the ends of a cross-rod J, to which a bevel-wheel K is secured in or about its center. In gear with the bevel-wheel K is a bevel-wheel L, mounted upon a rod M, that passes just under the roof of the vehicle, its outer end passing through the side of the peep-hole A' and is fitted with a lever N, by which the rods, bevel-wheels, and doors are operated. Thus when the lever N lies upon the roof on one side the doors E are closed. Now should it be desired to open the doors to allow a person to enter or alight then the driver turns the lever N over, so that it lies upon the roof on the other side. In so doing the rod M is rotated one-half of a circle, which, through gears L K, gears I H, upright rods G, and rods F, turns the hinge-leaves secured to the door one in one direction and one in the opposite direction. Thus the doors are opened or closed by the driver operating the lever N.

The front window or glass sash P is raised or lowered in the following manner: On one side of the driver's seat just under the roof is fitted a rod Q, connected at its inner end to brackets U, that are attached to the sash or glass frame P, that is carried by two small trucks or trolleys R, having wheels $s$ $s$ that run in a grooved track T, the front end of which is secured to the side jamb and the rear secured to the roof.

To the under side of each of the tracks T, in or about the center of their length, is a small lug $t$, to which a lever U is fulcrumed, the rear end of which is curved or bent up, as shown at $u$, and its forward end is fitted with a small roller $u'$. When the driver wishes to raise the window or glass sash, he draws upon the rod Q, thus causing the wheels $s$ $s$ of the trucks R to travel along the grooved tracks T, thereby drawing back the upper end of the window or glass sash P, which then comes into contact with and rests upon rollers $p$, secured to the side frames. The sash-frame P is thereby tilted and carried by said rollers $p$ until said sash rests upon the rollers $u'$ on the end of the levers U. Then as the upper end of the sash P is drawn back it comes into contact with the bent ends $u$ of the levers U. Said ends, being thus depressed by the sash P, throw their forward ends up and raise the sash, so that it stands just under the roof.

Should it be desired to lower the sash, all that has to be done is to push in the rod Q, and the sash will fall and rest upon the upper edges of the doors.

Instead of the trolleys R, wheels $s$ $s$, and grooved tracks T for raising and lowering the window-sash, as before described, if desired, a rod W, having a tubular piece X mounted and free to slide thereon and fulcrumed to the brackets on the window or glass frame P, as shown in Fig. 4, might be employed.

It will be seen that by the above-described construction both the window or glass sash frame and the doors can be easily and readily operated by the driver without his moving from his seat.

What we claim is—

1. In a hansom-cab a pair of folding doors attached to the carriage-body by hinges, an upright rod on each side, means arranged just under the roof for imparting a rotary motion to said rods, a universal joint at the lower end of each of said upright rods to which are connected rods set on an angle corresponding to that of the hinges of the door, the lower ends of said rods being rigidly secured thereto so that the doors will be opened or closed according to the motion imparted to the upright rods substantially as set forth.

2. In a hansom-cab a pair of folding doors attached to the body by hinges, a rod on each side passing through said hinges and forming the pintle, one leaf of each of said hinges being rigidly secured to its rod, each of said rods being by a universal joint attached to an upright rod, a bevel-wheel on the upper end of each of said upright rods, in combination with a rod extending transversely across the top of the vehicle, a bevel-wheel on each end of same and a bevel-wheel in its center, a longitudinal rod having a bevel-wheel at its inner end in gear with the central bevel-wheel on the transverse rod and a lever on the outer end to operate same substantially as set forth.

3. In a hansom-cab, a window-sash, trolley-frames fulcrumed to its upper end, one on each side grooved tracks for the wheels of the trolley-frames to run in, a longitudinal rod attached to the widow-frame by brackets and fitted at its outer end with a handle, and a small roller on each side of the carriage-body at the rear of the sash to tilt same when the longitudinal rod is operated substantially as set forth.

4. In a hansom-cab, a window-sash, a trolley-frame fulcrumed to its upper end on each side, grooved tracks for the wheels of the trolley-frames to run in, a longitudinal rod attached to the window or sash frame by brackets and having a handle at its outer end, a small roller on each side of the carriage-body at the rear of the sash to tilt same when the longitudinal rod is drawn back, in combination with a lever fulcrumed to the under side of each track each of said levers having a roller at its forward end and bent upward at its rear end whereby the sash is raised to a level substantially as set forth.

In testimony whereof we have signed our names to this specification, in the presence of two subscribing witnesses, on this 12th day of July, A. D. 1897.

LUBIN PARADIS.
NARCISSE DESROSIERS.

Witnesses:
NEWELL D. ATWOOD,
EDWIN PLANTA.